(12) United States Patent
Ferianz

(10) Patent No.: US 7,486,788 B2
(45) Date of Patent: Feb. 3, 2009

(54) TRANSCEIVER WITH INTEGRATED HYBRID CIRCUIT

(75) Inventor: Thomas Ferianz, Glanegg (AT)

(73) Assignee: Infineon Technologies AG, Munich (DE)

(*) Notice: Subject to any disclaimer, the term of this patent is extended or adjusted under 35 U.S.C. 154(b) by 848 days.

(21) Appl. No.: 10/617,310

(22) Filed: Jul. 10, 2003

(65) Prior Publication Data
US 2004/0053579 A1 Mar. 18, 2004

(30) Foreign Application Priority Data
Jul. 30, 2002 (DE) .................. 102 34 725

(51) Int. Cl.
*H04M 1/00* (2006.01)
*H04M 9/00* (2006.01)
(52) U.S. Cl. .................. 379/402; 379/345; 379/390.04
(58) Field of Classification Search .................. 379/345, 379/390.04, 402
See application file for complete search history.

(56) References Cited

U.S. PATENT DOCUMENTS 6,917,682 B2 * 7/2005 Vanderbauwhede et al. ................ 379/406.01

FOREIGN PATENT DOCUMENTS

| CN | 1347204 | 5/2002 |
|----|---------|--------|
| CN | 1355962 | 6/2002 |
| DE | 29 44 686 | 5/1981 |
| DE | 10045721 | 3/2002 |
| EP | 0902 550 | 8/1998 |
| JP | 2001-211105 | 8/2001 |
| WO | WO 01/99302 | 12/2001 |

OTHER PUBLICATIONS

Japanese Office Action dated Sep. 26, 2006.
INPI Search Report dated Dec. 17, 2004.
Chinese Office Action dated Jul. 14, 2006.

* cited by examiner

*Primary Examiner*—Alexander Jamal
(74) *Attorney, Agent, or Firm*—Jenkins, Wilson, Taylor & Hunt, P.A.

(57) ABSTRACT

A transceiver for a transmission and reception signal which can be transmitted via a signal line having a particular line impedance ($Z_{LINE}$), having a line driver (6) for driving a transmission signal via the signal line and having an analog echo cancellation filter (15) for signal suppression for an echo signal brought about by the transmission signal, where the line driver (6) has a synthesized output impedance ($R_{SYN}$), with the line driver (6) having a downstream hybrid circuit (11) for connecting an analog echo cancellation filter (15).

7 Claims, 2 Drawing Sheets

TRANSCEIVER WITH INTEGRATED HYBRID CIRCUIT

TECHNICAL FIELD

The invention relates to a transceiver or transmission and reception circuit with an integrated hybrid circuit.

BACKGROUND ART

FIG. 1 shows a transmission and reception circuit or transceiver based on the prior art.

The transmission and reception circuit contains a transmission signal source which sends a transmission signal to a line signal driver LT. The line driver is of differential design and amplifies the received transmission signal. The output side of the line driver is connected via resistors to a transmission signal line for transmitting a transmission and reception signal. The signal line has a particular line impedance.

The transmission and reception circuit contains a reception filter which filters out the signal received via the signal line. An echo cancellation filter or balancing filter connected between the line driver LT and the resistors R is used to simulate the frequency response which the transmission signal experiences up to the input of the subtractor as a result of $Z_{LINE}$ and the reception filter. The echo cancellation filter filters out the transmission signal amplified by the line driver LT. The transmission signal filtered out by the echo cancellation filter is subtracted from an output signal from the reception filter by a subtractor, so that the transmission signal contained in the output signal from the reception filter is compensated for. The output of the subtractor then provides the wanted reception signal, which is supplied for further signal processing to a reception signal processing circuit within the transceiver.

Transmission and reception circuits or transceivers used in broadband communication systems, particularly in xDSL systems, need to satisfy very great demands in terms of power loss.

German patent No. 100 45 721 describes a differential line driver circuit which requires only a low supply voltage and has low power loss. The differential line driver circuit described therein has two input connections for applying a first and a second input signal. The differential line driver circuit also contains two operational amplifiers. The noninverting input on the first operational amplifier is connected to the first input connection on the line driver circuit, and the signal output of the first operational amplifier is connected via a feedback resistor to the inverting input on the first operational amplifier. The noninverting input on the second operational amplifier is connected to the second input connection on the line driver circuit. The signal output of the second operational amplifier is connected via a further feedback resistor to the inverting input on the second operational amplifier. A setting resistor is used for setting gain, the setting resistor being connected between the inverting inputs on the two operational amplifiers. In addition, a first matching resistor connected between the signal output of the first operational amplifier and an output connection on the line driver circuit is provided. A second matching resistor is provided between the signal output of the second operational amplifier and a second output connection on the line driver circuit.

The differential line driver circuit in DE 100 45 721 has a first and a second positive feedback resistor.

The first positive feedback resistor is connected between the first output connection on the line driver circuit and the inverting input on the second operational amplifier. The second positive feedback resistor is connected between the second output connection on the line driver circuit and the inverting input on the first operational amplifier. In the case of the conventional differential line driver circuit, as described in DE 100 45 721, the output impedance of the line driver circuit is matched to the impedance of the signal line. In this context, the output impedance is determined by the product of an output impedance synthesis factor and the sum of the impedances of the two matching resistors.

In the case of the transceiver shown in FIG. 1, based on the prior art, it is not possible to use a differential line driver circuit, as described in DE 100 45 721, because the echo cancellation filter when using a line driver LT with impedance synthesis can no longer be connected directly to the reception-signal-free outputs of the line driver. A line driver LT with synthesized output impedance physically has no reception-signal-free outputs. It is likewise not possible to connect the echo cancellation filter to the signal inputs on the line driver LT, because the nonlinearities of the line driver LT are no longer compensated for on the subtractor. For this purpose, the line driver needs to be of more linear design around the echo suppression of the analog echo cancellation filter or balance filter, i.e. in an order of magnitude of between 20 and 30 decibels. This in turn disadvantageously results in larger quiescent currents in the line driver LT and thus in higher power loss. It is likewise not possible to connect the echo cancellation filter between the synthesized portion ($R_{SYN}$) and the physical portion (R) of the terminating impedance. In this case, a large part of the reception signal is suppressed by the subtractor.

On account of the aforementioned drawbacks, there has therefore previously been no use of synthesized line drivers LT, i.e. of line drivers which have a synthesized output impedance, in broadband communication systems containing echo cancellation filters.

SUMMARY OF THE INVENTION

It is therefore the object of the present invention to provide a transceiver having an echo cancellation filter which has low power loss on account of the line driver of differential design with synthesized output impedance.

The invention achieves this object by means of a transceiver having the features cited in patent claim 1.

The invention provides a transceiver for a transmission and reception signal which can be transmitted via a signal line, having:

a line driver for driving a transmission signal via the signal line and having an analog echo cancellation filter for signal suppression for an echo signal brought about by the transmission signal, where the line driver has a synthesized output impedance, and a hybrid circuit is provided which is provided for the purpose of connecting the analog echo cancellation filter to the signal transmission line.

The inventive transceiver is provided with a hybrid circuit which allows connection of the analog echo cancellation filter even when using a line driver with synthesized output impedance.

In one preferred embodiment of the inventive transceiver, the analog echo cancellation filter is programmable.

In one particularly preferred embodiment of the inventive transceiver, the transfer function of the echo cancellation filter has a programmable pole point and a programmable zero point.

The line driver is preferably of differential design.

The synthesized output impedance is preferably real.

The hybrid circuit used in the inventive transceiver preferably has a first two-pole connection for connection to the output of the line driver,
a second two-pole connection for connection to the signal line, and
a third two-pole connection for connection to the echo cancellation filter.

The first connection on the hybrid circuit and the second connection on the hybrid circuit preferably have series resistors between them which are connected in series with the line impedance $Z_{LINE}$ of the signal line.

Preferably, the first connection on the hybrid circuit and the second connection on the hybrid circuit respectively have a first and a second series-connected cross-coupling resistor between them.

The third two-pole connection on the hybrid circuit for connecting the echo cancellation filter is preferably tapped off between two respective series-connected crosscoupling resistors.

The resistors connected in the hybrid circuit are preferably real resistors.

In one preferred embodiment, the hybrid circuit is of symmetrical design.

The inventive transceiver preferably has an analog reception filter for filtering a signal received via the signal line.

In one preferred embodiment of the inventive transceiver, a subtraction circuit is provided which subtracts from the filtered output signal from the reception filter the transmission signal filtered out by the analog echo cancellation filter in order to generate a reception signal which has been liberated of the echo signal.

The inventive transceiver is preferably used for broadband communication systems.

The broadband communication system is preferably an xDSL broadband communication system.

A preferred embodiment of the inventive transceiver is described below with reference to the appended figures in order to explain features which are fundamental to the invention.

BRIEF DESCRIPTION OF THE DRAWINGS

In the figures.

DETAILED DESCRIPTION OF THE INVENTION

Figure 1:
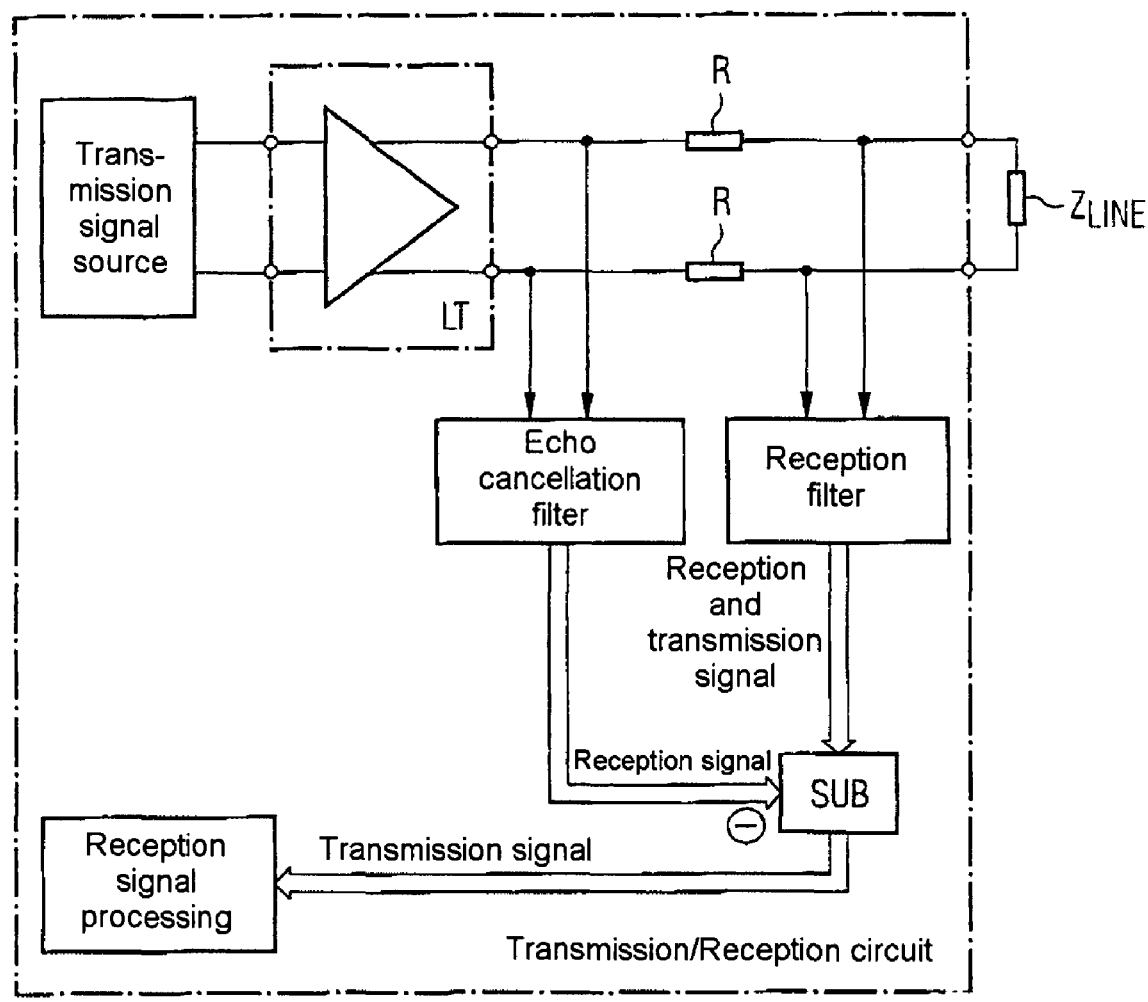
FIG. 1 shows a transceiver based on the prior art.
Figure 2:
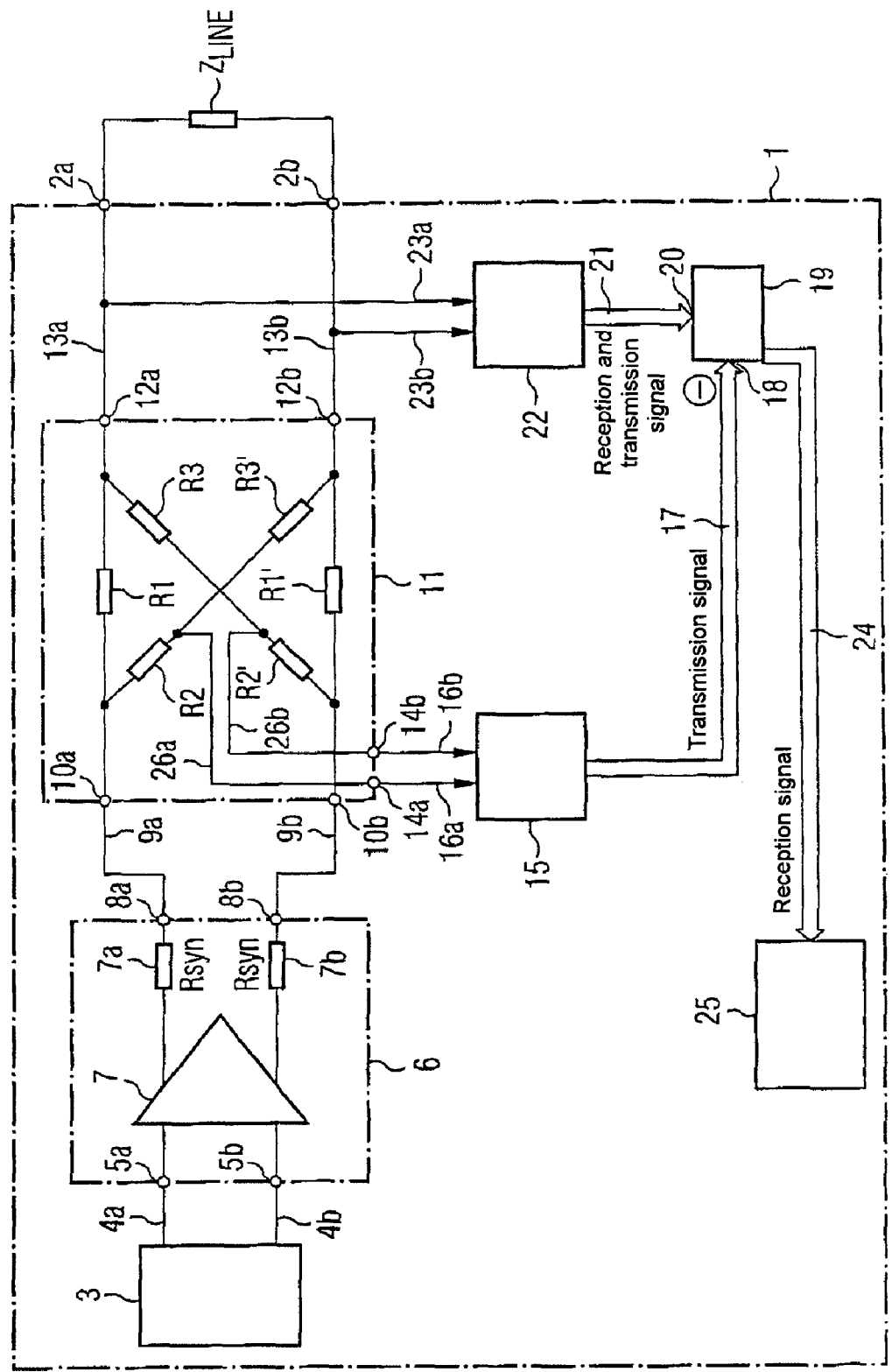
FIG. 2 shows a preferred embodiment of the inventive transceiver.

The transceiver or transmission and reception circuit 1 based on the invention, as shown in FIG. 2, has a line interface with two connections 2a, 2b for connecting a signal line having a particular line impedance $Z_{LINE}$. The transceiver 1 uses the signal line to transmit a transmission signal and to receive a reception signal. The transceiver 1 has a transmission signal source 3, the output side of which is connected via lines 4a, 4b to input connections 5a, 5b on a line driver 6. The line driver 6 is used for signal amplification for the transmission signal and is preferably of differential design. For signal amplification, the line driver 6 contains, in one preferred embodiment, at least one operational amplifier 7 having synthesized output impedances 7a, 7b to minimize power loss. The line driver 6 has output signal terminals 8a, 8b which are connected via lines 9a, 9b to connection terminals 10a, 10b of a first two-pole connection 10 on a hybrid circuit 11. The hybrid circuit 11 has a total of three two-pole connections 10a, 10b. The first two-pole connection is used for connection to the output of the line driver 6. The second two-pole connection 12 with the connection terminals 12a, 12b is used for connecting the hybrid circuit 11 to the line interface 2a, 2b on the transceiver 1. For this purpose, the connection terminals 12a, 12b are connected via signal lines 13a, 13b to the connection terminals 2a, 2b on the line interface 2. The hybrid circuit 11 has a third two-pole connection 14 with connection terminals 14a, 14b for connecting an analog echo cancellation filter or B-filter 15. The echo cancellation filter 15 is connected via lines 16a, 16b to the connection terminals 14a, 14b on the hybrid circuit 11. The echo cancellation filter 15 is an analog filter which is provided for signal suppression for an echo signal brought about by the transmission signal.

The analog echo cancellation filter 15 is preferably programmable. In this case, the echo cancellation filter 15 can be matched to the complex line impedance $Z_{LINE}$. In one preferred embodiment of the echo cancellation filter 15 or B-filter 15, this filter comprises an active stage and a passive circuit part. The echo cancellation filter 15 preferably has a transfer function with a pole point and a zero point. The echo cancellation filter 15 simulates the transmission signal transmitted by the transceiver 1 and sends this simulated transmission signal via lines 17 to a first input 18 on a subtraction circuit 19. In this case, the echo cancellation filter 15 simulates the frequency response which the transmission signal experiences up to the input of the subtractor as a result of $Z_{LINE}$ and the reception filter. The subtraction circuit 19 has a further input 20 which is connected via lines 21 to an output on a reception filter 22. The input side of the analog reception filter 22 is connected via lines 23a, 23b to the line interface 2a, 2b on the transceiver 1. The reception filter 22 filters the reception signal out of the signal which is present on the line interface 2a, 2b. The reception signal and its overlaid transmission signal are sent from the output side of the reception filter 22 to the second input 20 on the subtraction circuit 19. The subtraction circuit 19 subtracts from the reception signal with the overlaid transmission signal the transmission signal filtered out by the echo cancellation filter 15, so that the transmission signal contained in the overlaid signal is compensated for. The output side of the subtraction circuit 19 sends the pure reception signal via lines 24 to a reception signal processing circuit 25 contained in the transceiver for the purpose of further signal processing.

The hybrid circuit 11 is provided for the purpose of connecting the analog echo cancellation filter 15 to the signal transmission line. The line driver circuit 6 amplifies the transmission signal sent by the transmission signal source 3 and subjects it to nonlinearities. In order to obtain the transmission signal subjected to nonlinearities from the line driver 6 at the output of the line driver 6, the hybrid circuit 11 has a special design. The hybrid circuit 11 has series resistors R1, R1' which are connected in the longitudinal direction between the first two-pole connection 10a, 10b and the second two-pole connection 12a, 12b. The series resistors R1, R1' are preferably formed by the matching resistors in the line driver 6, which are provided for impedance synthesis. In addition, the hybrid circuit 11 contains first and second crosscoupling resistors R2, R3 and R2' and R3'. In this case, two respective crosscoupling resistors R2, R3' and R3, R2' are connected in series, as can be seen from FIG. 2. The third two-pole connection 14 on the hybrid circuit 11 is tapped off between the series-connected crosscoupling resistors R2', R3 and R2, R3' via lines 26a, 26b. The hybrid circuit 11 is of symmetrical design, i.e.:
R1=R1'
R2=R2' and
R3=R3'

The synthesized output impedances 7a, 7b in the line driver circuit 6 and the resistors R1, R1' are used as terminating impedances for the transceiver 1. The hybrid circuit 11 outputs the transmission signal amplified by a line driver 6 on the third two-pole connection 14a, 14b. This is achieved by fully eliminating the reception signal arriving on the line interface 2a, 2b at the output 14a, 14b of the hybrid circuit 11.

The signal received by the transceiver 1 on the line interface 2a, 2b is a factor of F $$F = \frac{R_{SYN}}{(R_{SYN} + R1)}$$

smaller at the output of the line driver 6 as compared with the amplitude on the line interface 2a, 2b, on account of the voltage division brought about by the resistors. So that the reception signal does not bring about any actuation on the output connection 14a, 14b on the hybrid circuit 11, the resistor R2 is chosen to be smaller by this factor of F than the resistance of the resistor R3. With this design, the constraint that the resistance values of the series resistors R1, R1' are much smaller than the resistance values of the crosscoupling resistors R2, R2' and R3, R3', for example approximately two hundred times smaller, also applies.

For one particularly preferred embodiment of the hybrid circuit 11, the latter is of symmetrical design, where
R1=R1'
R2=R2' and
R3=R3'.

In addition, under the ancillary condition of R1, R1' being less than R2, R2', R3, R3', the resistance values satisfy the following relationship:

$$R2 = R3 \cdot \frac{R_{SYN}}{R1 + R_{SYN}}$$

If the hybrid circuit 11 is designed in accordance with the aforementioned conditions, the output signal from the hybrid circuit on the third connection 14a, 14b is entirely liberated of reception signal components. This applies for any impedance values of the line impedance $Z_{LINE}$. The B-filter 15 is thus supplied exclusively with the amplified transmission signal subjected to the nonlinearities from the line driver 6. The B-filter or echo cancellation filter 15 generates therefrom a transmission signal which is simulated from the frequency response of the reception signal path and is supplied to the subtractor 19. The hybrid circuit 11 allows a B-filter 15 or echo cancellation filter 15 to be provided even for line drivers 6 having a synthesized output impedance. On account of the synthesized output impedance, the power loss from the line driver 6 within the transceiver 1 is low.

The inventive transceiver 1 is thus distinguished by low power loss with simultaneous high echo signal suppression. The transceiver 1 is thus outstandingly suitable for use in broadband communication systems, particularly xDSL communication systems.

LIST OF REFERENCES

| 1 | Transceiver |
| 2 | Line interface |
| 3 | Transmission signal source |
| 4 | Line |
| 5 | Line driver input |
| 6 | Line driver circuit |
| 7 | Operational amplifier |
| 7a, 7b | Synthesized output impedance |
| 8 | Line driver output |
| 9a, 9b | Lines |
| 10a, 10b | Connection on the hybrid circuit |
| 11 | Hybrid circuit |
| 12a, 12b | Second connection on the hybrid circuit |
| 13a, 13b | Lines |
| 14a, 14b | Third connection on the hybrid circuit |
| 15 | Echo cancellation filter |
| 16a, 16b | Lines |
| 17 | Lines |
| 18 | Input on the subtractor |
| 19 | Subtractor |
| 20 | Input on the subtractor |
| 21 | Lines |
| 22 | Reception filter |
| 23a, 23b | Lines |
| 24 | Signal lines |
| 25 | Reception signal processing circuit |
| 26a, 26b | Lines |

The invention claimed is:

1. A transceiver for a transmission and reception signal which can be transmitted via a signal line having a particular line impedance, comprising:
   a) a line driver for driving a transmission signal via the signal line, the line driver having a synthesized output impedance;
   b) a programmable analog echo cancellation filter for signal suppression for an echo signal brought about by the transmission signal;
   c) a hybrid circuit for connecting said analog echo cancellation filter to the signal line, the hybrid circuit comprising:
      a first two-pole connection connected to the output of the line driver,
      a second two-pole connection for connection to the signal line,
      a third two-pole connection connected to the analog echo cancellation filter,
      series resistors being connected, in series with the line impedance of the signal line, between the first two-pole connection and the second two-pole connection,
      a first and a second series-connected crosscoupling resistor respectively connected between the first two-pole connection and the second two-pole connection,
      wherein the third two-pole connection of the hybrid circuit for connecting the echo cancellation filter is tapped off between the series-connected crosscoupling resistors, and
      wherein the resistance values of the resistors connected in the hybrid circuit satisfy the following equation:

$$R2 = R3 \cdot \frac{R_{SYN}}{R1 + R_{SYN}}$$

Where R1 is the resistance value of the series resistors, R2 is the resistance value of the first crosscoupling resistor, and R3 is the resistance value of the second crosscoupling resistor, and where $R_{SYN}$ is the synthesized output impedance of the line driver,
   d) a reception filter for filtering a signal received via the signal line; and e) a subtraction circuit which subtracts from the filtered output signal of the reception filter the transmission signal simulated by the echo cancellation filter to generate a reception signal liberated of the echo signal.

2. The transceiver as claimed in claim 1, wherein the transfer function of the echo cancellation filter has a programmable pole point and a programmable zero point.

3. The transceiver as claimed in claim 1, wherein the line driver is of differential design.

4. The transceiver as claimed in claim 1, wherein the synthesized output impedance of the line driver is real.

5. The transceiver as claimed in claim 1, wherein the resistors connected in the hybrid circuit are real resistors.

6. The transceiver as claimed in claim 1, wherein the hybrid circuit is of symmetrical design.

7. The use of the transceiver as claimed in claim 1 for a broadband communication system, particularly for an xDSL broadband communication system.

* * * * *